Patented Aug. 10, 1926.

1,595,269

UNITED STATES PATENT OFFICE.

HERMANN WAGNER, OF SODEN, AND ALBERT FUNKE, OF HOCHST-ON-THE-MAIN, GERMANY, ASSIGNORS TO GRASSELLI DYESTUFF CORPORATION, OF NEW YORK, N. Y., A CORPORATION.

YELLOWISH-RED AZO DYESTUFFS AND PROCESS OF MAKING SAME.

No Drawing.    Application filed October 8, 1925. Serial No. 61,301.

We have found that new azo dyestuffs giving valuable yellowish-red tints and the lakes of which are of great fastness to light, can be obtained if 3-nitro-4-diazo-1-phenol ethers, especially the ethyl- or methyl-ethers, are combined with an aceto-acetic acid anilide which is substituted either by an alkyl group in ortho position to the amino group, or by an alkyloxy group in para position to an amino group. In the first place the aceto-acetic acid ortho-toluidide, the para-anisidides or para-phenetidides or their homologues or substitution products may be practically used.

Our invention is illustrated by the following examples, the parts being by weight:

(1) 18.2 parts of 3-nitro-4-amino-1-phenol ethyl ether are diazotized and the solution of the diazo compound is run into an aqueous suspension of 20 parts of aceto-acetic acid ortho-toluidide to which has been added the required quantity of sodium acetate in order to facilitate the reaction.

The coupling process is finished at once. The separated and dried dyestuff is a yellowish-red powder.

(2) The diazo solution of 18.2 parts of 3-nitro-4-amino-1-phenol ethyl ether is run into an aqueous suspension of 21.5 parts of aceto-acetic para-anisidide to which has been added the required quantity of sodium acetate in order to facilitate the reaction. The formation of the dyestuff proceeds quickly and is immediately complete. In this way a yellowish-red dyestuff is obtained.

(3) The diazo solution of 16.8 parts of 3-nitro-4-amino-1-phenol methyl ether is coupled with an alkaline solution of 20 parts of aceto-acetic ortho-toluidide in presence of sodium carbonate. The resulting yellowish-red dyestuff is filtered off by suction and used in the form of a paste or a powder.

We claim:

1. The process of producing yellowish-red azo dyestuffs, which consists in coupling a 3-nitro-4-diazo-1-phenol-alkyl ether with an aceto-acetic anilide of the following composition:

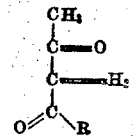

wherein R stands for an ortho-alkylanilide residue or a para-alkyloxy anilide residue.

2. As new products, azo dyestuffs of the following composition:

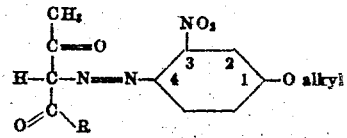

wherein R stands for an ortho-alkylanilide residue or a para-alkyloxy anilide residue, said dyestuffs being, when dry, yellowish-red powders, insoluble in water, dissolving in sulfuric acid to a reddish-yellow solution.

3. As a new product, the azo dyestuff of the following composition:

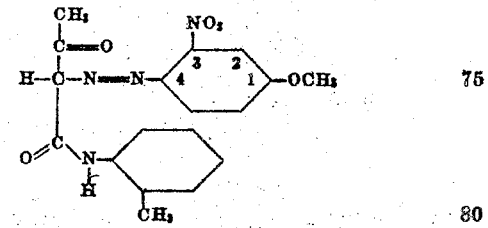

being, when dry, a yellowish-red powder, dissolving in sulfuric acid to a reddish-yellow solution.

In testimony whereof, we affix our signatures.

Dr. HERMANN WAGNER.
Dr. ALBERT FUNKE.